(12) United States Patent　　(10) Patent No.: US 11,840,612 B2
Misumi et al.　　(45) Date of Patent: Dec. 12, 2023

(54) PREPREG, LAMINATE, AND MOLDING

(71) Applicant: Toray Industries, Inc., Tokyo (JP)

(72) Inventors: Jun Misumi, Ehime (JP); Masato Honma, Ehime (JP); Kyoko Shinohara, Ehime (JP); Noriyuki Hirano, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 17/607,981

(22) PCT Filed: May 15, 2020

(86) PCT No.: PCT/JP2020/019466
§ 371 (c)(1),
(2) Date: Nov. 1, 2021

(87) PCT Pub. No.: WO2020/235484
PCT Pub. Date: Nov. 26, 2020

(65) Prior Publication Data
US 2022/0324184 A1　　Oct. 13, 2022

(30) Foreign Application Priority Data

May 23, 2019　(JP) ................................. 2019-097030
May 23, 2019　(JP) ................................. 2019-097033

(51) Int. Cl.
*C08J 5/24*　　(2006.01)
*B29C 70/00*　　(2006.01)
(Continued)

(52) U.S. Cl.
CPC ........... *C08J 5/243* (2021.05); *B29C 70/0035* (2021.05); *B29C 70/18* (2013.01); *B29C 70/88* (2013.01);
(Continued)

(58) Field of Classification Search
CPC ...... C08J 5/243; B29C 70/0035; B29C 70/18; B29C 70/88; B29K 2063/00;
(Continued)

(56) References Cited

U.S. PATENT DOCUMENTS 8,415,007 B2　4/2013　Honma et al.
2006/0110599 A1*　5/2006　Honma .................. H05K 9/009
428/522

(Continued)

FOREIGN PATENT DOCUMENTS

EP　　2623533 A1　　8/2013
EP　　3572452 A1　　11/2019
(Continued)

OTHER PUBLICATIONS

Polyetherimide, Wikipedia, accessed online Apr. 18, 2023.*
(Continued)

*Primary Examiner* — Camie S Thompson
(74) *Attorney, Agent, or Firm* — RATNERPRESTIA (57) ABSTRACT

An object of the present invention is to provide a prepreg and a laminate for producing a laminate suitable as a structural material, which have excellent compressive strength and interlaminar fractural toughness values, and can be firmly integrated with another structural member by welding. The present invention provides a prepreg including the following structural components [A] reinforcing fibers, [B] a thermosetting resin, and [C] a thermoplastic resin, in which [B] has a rubbery state elastic modulus of 10 MPa or more at a temperature obtained by adding 50° C. to a glass transition temperature in a state in which a degree of cure is 90% or more, [C] is present in a surface of the prepreg, and the reinforcing fibers [A] are present, which are included in a resin area including {B] and a resin area including [C] across an interface between the two resin areas.

31 Claims, 2 Drawing Sheets

(51) Int. Cl.

| | | |
|---|---|---|
| B29C 70/18 | (2006.01) | |
| B29C 70/88 | (2006.01) | |
| B29K 63/00 | (2006.01) | |
| B29K 101/12 | (2006.01) | |
| B29K 105/08 | (2006.01) | |
| B29K 307/04 | (2006.01) | |

(52) U.S. Cl.
CPC ...... *B29K 2063/00* (2013.01); *B29K 2101/12* (2013.01); *B29K 2105/0872* (2013.01); *B29K 2307/04* (2013.01); *B29K 2995/0046* (2013.01); *B29K 2995/0072* (2013.01); *B29K 2995/0077* (2013.01); *B29K 2995/0082* (2013.01)

(58) Field of Classification Search
CPC .... B29K 2995/0082; B29K 2995/0077; B29K 2995/0072; B29K 2995/0046; B29K 2101/12; B29K 2307/04
USPC .......... 428/413, 411.1, 474.4, 480, 412, 500, 428/423.1, 522, 523, 292.1, 297.4
See application file for complete search history.

(56) References Cited

U.S. PATENT DOCUMENTS

2017/0306117 A1\* 10/2017 Fuse ........................ C08J 5/243
2019/0225764 A1 7/2019 Harada et al.

FOREIGN PATENT DOCUMENTS

| JP | 08259713 A | 10/1996 |
|---|---|---|
| JP | 10138354 A | 5/1998 |
| JP | 3906319 B2 | 4/2007 |
| JP | 2015108078 A | 6/2015 |
| JP | 2017088652 A | 5/2017 |
| JP | 2018161801 A | 10/2018 |
| JP | 2019038939 A | 3/2019 |
| WO | 2018066600 A1 | 4/2018 |

OTHER PUBLICATIONS

International Search Report and Written Opinion for International Application No. PCT/JP2020/019466, dated Aug. 4, 2020, 9 pages.
Extended European Search Report for European Application No. 20810225.1, dated Jun. 22, 2023, 10 pages.

\* cited by examiner

PREPREG, LAMINATE, AND MOLDING

CROSS REFERENCE TO RELATED APPLICATIONS

This is the U.S. National Phase application of PCT/JP2020/019466, filed May 15, 2020, which claims priority to Japanese Patent Application No. 2019-097030, filed May 23, 2019 and Japanese Patent Application No. 2019-097033, filed May 23, 2019, the disclosures of each of these applications being incorporated herein by reference in their entireties for all purposes.

FIELD OF THE INVENTION

The present invention relates to a prepreg including reinforcing fibers, a thermosetting resin, and a thermoplastic resin; a laminate including reinforcing fibers, a thermoplastic resin, and a cured product of a thermosetting resin; and a molding.

BACKGROUND OF THE INVENTION

Fiber-reinforced composite materials in which a thermosetting resin or a thermoplastic resin is used as a matrix and is combined with reinforcing fibers such as carbon fibers or glass fibers are lightweight and have excellent dynamic characteristics such as strength and rigidity, heat resistance, and corrosion resistance, and therefore have been applied to many fields such as aerospace, automobiles, railway vehicles, ships, civil engineering and construction, and sporting goods. These fiber-reinforced composite materials, however, are unsuitable for producing parts or structures having a complicated shape in a single molding process, and in the above applications, it is necessary to produce a member including a fiber-reinforced composite material and then to integrate the member with the same or different kind of member. Mechanical joining methods using bolts, rivets, or screws, and joining methods using an adhesive are used as a method for integrating the fiber-reinforced composite material including the reinforcing fibers and the thermosetting resin with the same or different kind of member. The mechanical joining method has disadvantages in which a production process is prolonged and a production cost is increased because a process in which a joint is previously processed, such as drilling, is necessary, and the strength of the material is deteriorated because of the drilling. The joining method using the adhesive has disadvantages in which the production process is prolonged because the method requires a bonding process including preparation of an adhesive and coating of the adhesive, and a curing process, and the sufficient reliability in bonding strength cannot be obtained.

To the fiber-reinforced composite material using the thermoplastic resin as the matrix can be applied a method for joining members by welding, in addition to the mechanical joining method and the joining method using the adhesive described above, and thus the time required for joining the members may possibly be shortened. On the other hand, when the dynamic characteristics at a high temperature and excellent chemical resistance are required as in structural members for aircrafts, there is a problem of insufficient heat resistance and chemical resistance as compared with the fiber-reinforced composite material including the thermosetting resin and the reinforcing fibers.

Here, Patent Document 1 shows a method for joining a fiber-reinforced composite material including a thermosetting resin and reinforcing fibers through an adhesive.

Patent Document 2 shows a method for integrating a member formed from a thermoplastic resin with a member formed from a fiber-reinforced composite material including a thermosetting resin. That is, a thermoplastic resin film is laminated on a surface of a prepreg sheet including the reinforcing fibers and the thermosetting resin, and heated and pressurized to obtain a fiber-reinforced composite material. Thereafter, the obtained fiber-reinforced composite material is put in a mold, a thermoplastic resin is injection-molded, and the thermoplastic resin member, formed by the injection molding, is joined to the fiber-reinforced composite material.

In addition, Patent Document 3 shows a method for producing a laminate in which a thermoplastic resin adhesive layer is formed on a surface of a composite material including a thermosetting resin and reinforcing fibers, and describes that the laminate exhibits an adhesion effect with another member through the thermoplastic resin.

Patent Document 4 shows a prepreg including reinforcing fibers and a thermosetting resin, and having particles, fibers, or films including a thermoplastic resin disposed on a surface layer of the prepreg, and a fiber-reinforced composite material thereof.

PATENT DOCUMENTS

Patent Document 1: Japanese Patent Laid-Open Publication No. 2018-161801
Patent Document 2: Japanese Patent Laid-Open Publication No. 10-138354
Patent Document 3: Japanese Patent No. 3906319
Patent Document 4: Japanese Patent Laid-Open Publication No. 8-259713

SUMMARY OF THE INVENTION

The method disclosed in Patent Document 1, however, is a method for joining the fiber-reinforced composite materials including the reinforcing fibers and the thermosetting resin to each other using the adhesive, and welding cannot be applied to the method for joining the fiber-reinforced composite materials as they are, because the thermosetting resin is used as a matrix resin. There is a problem of the joining process needing time because the curing of the adhesive needs time, and further, the joining strength exhibited is insufficient.

According to the method described in Patent Document 2, the joining strength is insufficient at the joint between the thermosetting resin and the thermoplastic resin film in the fiber-reinforced composite material.

The fiber-reinforced composite material according to Patent Document 3 can be integrated by welding through the thermoplastic resin, and exhibits excellent joining strength at room temperature, but has the insufficient joining strength at a high temperature.

Patent Document 4 shows that interlaminar fractural toughness values are improved by the particles, fibers or films including the thermoplastic resin, but according to this method, the joining strength is insufficient at a boundary between the thermosetting resin and the thermoplastic resin in the fiber-reinforced composite material.

Therefore, an object of the present invention is to provide a prepreg, a laminate, and an integrated molding, which can be joined to the same or different kind of member by welding, exhibit excellent joining strength, particularly in a high-temperature environment, further exhibit excellent compressive strength and interlaminar fractural toughness value, and provide a laminate suitable as a structural material.

In order to solve such problems, the prepreg according to embodiments of the present invention has the following constitutions.

That is, it is a prepreg including the following structural components [A], [B], and [C], wherein [B] has a rubbery state elastic modulus of 10 MPa or more at a temperature obtained by adding 50° C. to a glass transition temperature in a state in which a degree of cure is 90% or more; [C] is present in a surface of the prepreg; and the reinforcing fibers [A] are present, which are included in a resin area including [B] and a resin area including [C] across an interface between the two resin areas.

[A] reinforcing fibers;
[B] a thermosetting resin; and
[C] a thermoplastic resin.

Furthermore, the laminate according to embodiments of the present invention is a laminate having the following configuration.

That is, it is a laminate including a layer including the following structural components [A], [C], and [D], wherein [D] has a rubbery state elastic modulus of 10 MPa or more at a temperature obtained by adding 50° C. to a glass transition temperature, and the reinforcing fibers [A] are present, which are included in a resin area including [D] and a resin area including [C] across an interface between the two resin areas.

[A] reinforcing fibers;
[C] a thermoplastic resin; and
[D] a cured product of a thermosetting resin.

The prepreg according to embodiments of the present invention uses the thermosetting resin and the thermoplastic resin and the resins are firmly joined to each other, and the prepreg can be favorably welded to the same or different kind of member, and thus, the time required for the joining process can be shortened and the molding speed of the structural members can be increased, as compared with a conventional fiber-reinforced composite material including a thermosetting resin and reinforcing fibers. Furthermore, because the rubbery state elastic modulus is excellent at a predetermined temperature, the excellent compressive strength and joining strength in a high-temperature environment are exhibited, and a laminate excellent as a structural material is obtained. The laminate of the present invention exhibits excellent performance as a structural body when it is applied to aircraft structural members, blades of a windmill, automobile structural members, and computer applications such as IC trays and housings of laptop computers, and the use of the prepreg of the present invention makes it possible to greatly reduce the molding time and the molding cost of the products concerning the applications described above.

DETAILED DESCRIPTION OF EMBODIMENTS OF THE INVENTION

The reinforcing fibers, the structural component [A], used in the present invention, may include glass fibers, carbon fibers, metal fibers, aromatic polyamide fibers, polyaramid fibers, alumina fibers, silicon carbide fibers, boron fibers, basalt fibers, and the like. They may be used alone or in combination of 2 or more, as appropriate. The reinforcing fibers may be subjected to a surface treatment. The surface treatment may include a metal deposition treatment, a treatment using a coupling agent, a treatment using a sizing agent, an additive deposition treatment, and the like. The reinforcing fibers may include reinforcing fibers having conductivity. As the reinforcing fibers, the carbon fibers are preferably used because of the low specific gravity, high strength, and high elastic modulus.

Commercially available products of the carbon fiber may include "TORAYCA (registered trademark)" T800G-24K", TORAYCA (registered trademark)" T800S-24K, "TORAYCA (registered trademark)" T700G-24K, "TORAYCA (registered trademark)" T700S-24K, "TORAYCA (registered trademark)" T300-3K, and "TORAYCA (registered trademark)" T1100G-24K (they are manufactured by Toray Industries, Inc.), and the like.

The form and arrangement of the reinforcing fibers can be appropriately selected from forms or arrangements in which the reinforcing fibers are arranged in one direction, laminates of products in which the reinforcing fibers are arranged in one direction, and woven fabrics, and the like, and in order to obtain a laminate which is lightweight and has a higher level of durability, it is preferable that the reinforcing fibers are in a form of a continuous fiber, such as long fibers (fiber bundles) of the reinforcing fibers arranged in one direction or a woven fabric, in each prepreg.

The reinforcing fiber bundle may be composed of a plurality of fibers in the same form, or may be composed of a plurality of fibers in the different forms. The number of the reinforcing fibers forming one reinforcing fiber bundle is usually 300 to 60,000, and is preferably 300 to 48,000, more preferably 1,000 to 24,000 in consideration of production of a base material. The range may be a combination of any of the above upper limits and any of the lower limits, described above.

The structural component [A], the reinforcing fibers, having a strand tensile strength, measured in accordance with the resin-impregnated strand test method of JIS R7608 (2007), of 5.5 GPa or more is preferable, because in such a case a laminate having the excellent joining strength in addition to the tensile strength can be obtained. The strand tensile strength is more preferably 5.8 GPa. The joining strength as used herein refers to a tensile shear joining strength determined in accordance with ISO 4587: 1995 (JIS K6850 (1994)).

The structural component [B] used in embodiments of the present invention is a thermosetting resin having a rubbery state elastic modulus of 10 MPa or more at a temperature obtained by adding 50° C. to a glass transition temperature in a state in which a degree of cure is 90% or more. The state in which the degree of cure of the structural component [B] is 90% or more can be achieved by thermally curing the thermosetting resin, which is the structural component [B], and the thermosetting resin composition before curing, which is specified as the curing agent, in predetermined conditions. The thermal curing in the predetermined conditions refers to conditions in which first heating is performed at 135° C. for 2 hours or at 180° C. for 2 hours, and further heating is added as necessary until the degree of cure reaches 90% or more. The degree of cure of the cured product of the thermosetting resin, obtained by heating at 135° C. for 2 hours or at 180° C. for 2 hours, is measured, and when the degree of cure is 90% or more, then the cured product of the thermosetting resin can be used for the characteristic evaluations. When the degree of cure is less than 90% at a heating temperature of 135° C. for 2 hours or at a heating temperature of 180° C. for 2 hours, post-heating is performed at 180° C. for 2 hours, and the degree of cure is confirmed. When the degree of cure is less than 90% after the post-heating, heating is performed until the degree of cure reaches 90% or more at 200° C., i.e., is sequentially performed for 1 hour, at 220° C. for 1 hour, and at 240° C. for 1 hour until the degree of cure reaches 90%. When the degree of cure does not reach 90% even after the heating at 240° C. for 1 hour, a desired cured product of the thermosetting resin is obtained by performing heating at a temperature of 300° C. or lower until the degree of cure reaches 90% or more, and it can be used for the characteristic evaluations.

Here, the degree of cure is a value obtained by calculating a calorific value of each of the structural component [B] which is the thermosetting resin, the thermosetting resin composition before curing which is specified as the curing agent, and the cured product of the thermosetting resin as an area of a peak appearing as an exothermic reaction when a differential scanning calorimetry is performed at a temperature-raising rate of 10° C./min in an inert gas atmosphere, and using the following formula. Apart from the structural component [B] included in the prepreg, resins having the same structure as those in the thermosetting resin and the composition specified as the curing agent are prepared, and they may be subjected to the measurement. Here, when the curing agent cannot be specified, 4,4'-diaminodiphenyl sulfone may be used as the curing agent in the composition. In addition, compounds described below in Examples such as a curing catalyst and a viscosity modifier can be preferably used as a component capable of forming the composition, and they are not particularly limited as long as they do not affect the measurement result.

Degree of cure(%)=((a calorific value of the composition including the thermosetting resin before curing)−(a calorific value of the cured product of the thermosetting resin))/(a calorific value of the composition including the thermosetting resin before curing)×100.

In addition, a storage elastic modulus is obtained in accordance with JIS K7244-7 (2007) at a temperature obtained by adding 50° C. to the glass transition temperature obtained from a storage elastic modulus curve in a dynamic viscoelasticity measurement (torsion measurement) of the cured product of thermosetting resin, which is defined as the rubbery state elastic modulus in embodiments of the present invention. When the rubbery state elastic modulus in embodiments of the present invention is less than 10 MPa, the compressive strength of the laminate and the joining strength at a high temperature when the laminate is joined to a member to integrate them cannot be sufficiently increased. The rubbery state elastic modulus is more preferably 12 MPa or more, still more preferably 15 MPa or more. The upper limit of the rubbery state elastic modulus is not particularly limited, and in a cured product of a normal thermosetting resin, the upper limit of the rubbery state elastic modulus is 50 MPa.

The cured product of the thermosetting resin, the structural component [D], in the present invention can be obtained by heating and curing the thermosetting resin. The curing of the structural component [D] included in the laminate can be determined in a manner in which when the laminate is subjected to a differential scanning calorimetry at a temperature-rising rate of 10° C./min in an inert gas atmosphere, if an area of a peak appearing as an exothermic reaction (residual heat generation) is 50 J/g or less, it can be determined that the laminate is substantially a cured product. Alternatively, when the thermosetting resin composition before curing can be specified, the degree of cure is obtained by using the formula described above, and if the value is 90% or more, it may be determined that the resulting laminate is the cured product. When the prepreg of the present invention is used, the thermosetting resin corresponds to the structural component [B]. The laminate of the present invention does not necessarily pass through the prepreg, but may be produced by a resin transfer molding method described below, or the like.

The thermosetting resin used as the structural component [B] may include, for example, unsaturated polyester resins, vinyl ester resins, epoxy resins, phenol resins, urea resins, melamine resins, polyimide resins, cyanate ester resins, bismaleimide resins, benzoxazine resins, copolymers or modified products thereof, and resins obtained by blending at least 2 kinds thereof. In order to improve the impact resistance, an elastomer or a rubber component may be added to the thermosetting resin. Among them, the epoxy resins are preferable because they are excellent in the dynamic characteristics, the heat resistance, and the adhesiveness to reinforcing fibers. The main agent of the epoxy resin may include, for example, bisphenol type epoxy resins such as bisphenol A type epoxy resin, bisphenol F type epoxy resin, bisphenol AD type epoxy resin, and bisphenol S type epoxy resin, brominated epoxy resins such as tetrabromobisphenol A diglycidyl ether, epoxy resins having a biphenyl backbone, epoxy resins having a naphthalene backbone, epoxy resins having a dicyclopentadiene backbone, novolac type epoxy resins such as phenol novolac type epoxy resin and cresol novolac type epoxy resin, N,N,O-triglycidyl-m-aminophenol, glycidyl amine type epoxy resins such as N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, N,N-diglycidylaniline, and N,N-diglycidyl-o-toluidine, resorcidyl glycidyl ethers, triglycidyl isocyanurates, and the like.

The structural component [B] of the present invention: The thermosetting resin preferably includes the epoxy resin, and an aspect in which the thermosetting resin includes the glycidyl amine type epoxy resin including 3 or more glycidyl groups in an amount of 40 to 100 parts by mass based on 100 parts by mass of the total epoxy resins included in the thermosetting resin is more preferable, because the cured product having the high rubbery state elastic modulus is obtained. The glycidyl amine type epoxy resin including 3 or more glycidyl groups may include N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, and the like.

The curing agent of the epoxy resin may include, for example, dicyandiamides, aromatic amine compounds, phenol novolac resins, cresol novolac resins, polyphenol compounds, imidazole derivatives, tetramethylguanidine, thiourea-added amines, carboxylic acid hydrazides, carboxylic acid amides, polymercaptans, and the like.

In particular, when the aromatic amine curing agent is used as the curing agent of the epoxy resin, the epoxy resins having the good heat resistance can be obtained. The aromatic amine compound may include, for example, 3,3'-diisopropyl-4,4'-diaminodiphenyl sulfone, 3,3'-di-t-butyl-4,4'-diaminodiphenyl sulfone, 3,3'-diethyl-5,5'-dimethyl-4,4'-diaminodiphenyl sulfone, 3,3'-diisopropyl-5,5'-dimethyl-4,4'-diaminodiphenyl sulfone, 3,3'-di-t-butyl-5,5'-dimethyl-4,4'-diaminodiphenyl sulfone, 3,3',5,5'-tetraethyl-4,4'-diaminodiphenyl sulfone, 3,3'-diisopropyl-5,5'-diethyl-4,4'-diaminodiphenyl sulfone, 3,3'-di-t-butyl-5,5'-diethyl-4,4'-diaminodiphenyl sulfone, 3,3',5,5'-tetraisopropyl-4,4'-diaminodiphenyl sulfone, 3,3'-di-t-butyl-5,5'-diisopropyl-4,4'-diaminodiphenyl sulfone, 3,3',5,5'-tetra-t-butyl-4,4'-diaminodiphenyl sulfone, 4,4'-diaminodiphenyl sulfone, 3,3'-diaminodiphenyl sulfone, and the like.

Furthermore, the thermosetting resin, the structural component [B], preferably includes a thermoplastic resin component soluble in a thermosetting resin in a dissolved state as a viscosity modifier. Such a thermoplastic resin component is another thermoplastic resin component different from the structural component [C]. Here, "soluble in a thermosetting resin" refers to a state in which when a mixture of a thermoplastic resin component with a thermosetting resin is heated or stirred while heating, there is a temperature region in which the mixture is in a uniform phase. Here, "in a uniform phase" refers to a state in which separation is not observed visually. Here, the "dissolved state" refers to a state in which when the temperature of the thermosetting resin including the thermoplastic resin component is adjusted to a certain region, a uniform phase is formed. Once the uniform phase is formed in the certain temperature range, there is no problem even if the separation may occur at a temperature other than the temperature range, for example, at room temperature.

The thermoplastic resin component soluble in the thermosetting resin, the structural component [B], is generally preferably a thermoplastic resin having a bond selected from the group consisting of a carbon-carbon bond, an amide bond, an imide bond, an ester bond, an ether bond, a carbonate bond, a urethane bond, a thioether bond, a sulfone bond, and a carbonyl bond in the main chain. In addition, the thermoplastic resin component may partially have a cross-linked structure, and may be crystalline or may be amorphous. In particular, a resin is preferable which is at least one resin selected from the group consisting of polyamide, polycarbonate, polyacetal, polyphenylene oxide, polyphenylene sulfide, polyarylate, polyester, polyamideimide, polyimide, polyetherimide, polyimide having a phenyltrimethylindane structure, polysulfone, polyethersulfone, polyetherketone, polyetheretherketone, polyaramid, polyvinyl formal, polyvinyl butyral, phenoxy resin, polyethernitrile, and polybenzimidazole. In order to obtain the good heat resistance, it is preferable that the glass transition temperature is 150° C. or higher, more preferably 170° C. or higher from the point of view in which it is difficult to cause the thermal deformation when used as a molded body, and the polyetherimide and the polyethersulfone are preferable examples.

It is also one of the preferable aspects from the point of view of the improvement of the flame retardancy that the phosphorus compound is included in the composition including the thermosetting resin, the structural component [B]. When the amount of phosphorus is too large, however, the bending strength of the cured product of the thermosetting resin may be reduced. From this, the phosphorus atomic concentration in the composition is preferably 0.1% by mass or more and 1.0% by mass or less, because the cured product of the thermosetting resin having the excellent bending strength is obtained.

The structural component [B] included in the prepreg of the present invention preferably has a bending strength of 150 MPa or more in a state in which the degree of cure is 90% or more, regardless of the presence or absence of the phosphorus compound. The structural component [D] included in the laminate according to embodiments of the present invention has a bending strength of 150 MPa or more. It is preferable that the cured product described above is included in the laminate of the present invention, because the joining strength is excellent when the laminate is joined to a member. The bending strength can be determined in accordance with a three-point bending test based on JIS K7171 (1994). When the bending strength of the structural component described above included in the prepreg or the laminate is determined, the kind of the thermosetting resin is specified, and then a composition including a resin, which is the same kind as the specified resin and is uncured, is formed in the same manner as in the measurement of the degree of cure, and the resulting composition is subjected to the measurement of the bending strength. At that time, beside the thermosetting resin to be measured, included in the prepreg or the laminate, another uncured resin having the same structure as that of the thermosetting resin may be prepared, and the other resin may be subjected to the measurement. The upper limit of the bending strength is not particularly limited, and in the cured products of normal thermosetting resins, the upper limit of the bending strength is 500 MPa.

The thermoplastic resin forming the structural component [C] is not particularly limited, and examples thereof may include polyester-based resins (polyethylene terephthalate, polybutylene terephthalate, polytrimethylene terephthalate, polyethylene naphthalate, liquid crystal polyester, and the like), polyolefin-based resins (polyethylene, polypropylene, polybutylene, and the like), styrene-based resins, urethane resins, polyoxymethylene, polyamide-based resins (aliphatic polyamides such as polyamide 6 and polyamide 66, semi-aromatic polyamides, alicyclic polyamides, and the like), polycarbonate, polymethyl methacrylate, polyvinyl chloride, polyphenylene sulfide, polyphenylene ether, modified polyphenylene ether, polyimide, polyamide imide, polyetherimide, polysulfone, modified polysulfone, polyether sulfone, polyketone, polyarylene ether ketone (polyether ketone, polyether ether ketone, polyether ketone ketone, and the like), polyarylate, polyether nitrile, phenol-based resins, phenoxy resins, and the like. In addition, these thermoplastic resins may be copolymers or modified products of the above-mentioned resins, and/or resins obtained by blending 2 or more kinds thereof.

Among them, in terms of the heat resistance, it is preferable that one resin or 2 or more resins selected from crystalline thermoplastic resins having a glass transition temperature of 80° C. or higher and amorphous thermoplastic resins having a glass transition temperature of 160° C. or higher are included in the thermoplastic resin, the structural component [C] in a content of 60% by weight or more. In addition, it is particularly preferable that one resin or 2 or more resins selected from polyarylene ether ketone, polyphenylene sulfide, and polyetherimide are included in the thermoplastic resin, the structural component [C], in a content of 60% by weight or more.

In order to improve the impact resistance, an elastomer or a rubber component may be added to the thermosetting resin or the thermoplastic resin. Furthermore, the thermosetting resin or the thermoplastic resin may appropriately include other fillers or additives as long as the object of the present invention is not impaired depending on the use. Examples thereof may include inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, coupling agents, and the like.

In the prepreg according to an embodiment of the present invention, the reinforcing fibers [A] are present included in the resin area including [B] and the resin area including [C] across the interface between the two resin areas.

The presence of [A] included in the two resin areas across the interface between the two resin areas can be confirmed by observing a cross-section obtained by cutting the prepreg vertically to the planar direction. One example is shown with reference to FIG. 2. In the observation image 9 in FIG. 2, in prepreg, the resin area 7 including the structural component [C] closely adheres to the resin area 8 including the structural component [B], and a surface at which the resin area 7 including the structural component [C] closely adheres to the resin area 8 including the structural component [B] is illustrated as an interface 10. In addition, a plurality of the structural components [A] 6 are present on the interface 10. The structural components [A] 6 on the interface 10 are brought into contact with both of the resin area 7 including the structural component [C] and the resin area 8 including the structural component [B]. The state in which the structural component [C] and the structural component [B] are brought into contact with each other around the reinforcing fibers, as described above, can refer to a state in which the reinforcing fibers are "included in the two resin areas across the interface".

Furthermore, when the prepreg according to an embodiment of the present invention is viewed in planar view, in a cross-section vertical to a plane of the prepreg including the fibers [A], present across the interface between the two resin areas, from a direction of an angle different by 45 degrees, either clockwise or counterclockwise, to the direction of any fiber [A] included in the two resin areas, i.e., in a cross-section obtained by cutting the prepreg vertically to the prepreg plane direction, it is preferable that a cross-sectional curve, formed by the interface between the two resins, has an average roughness length RSm, defined in accordance with JIS B0601 (2001), of 100 μm or less, and an average roughness height Rc of 3.5 μm or more.

Figure 2:
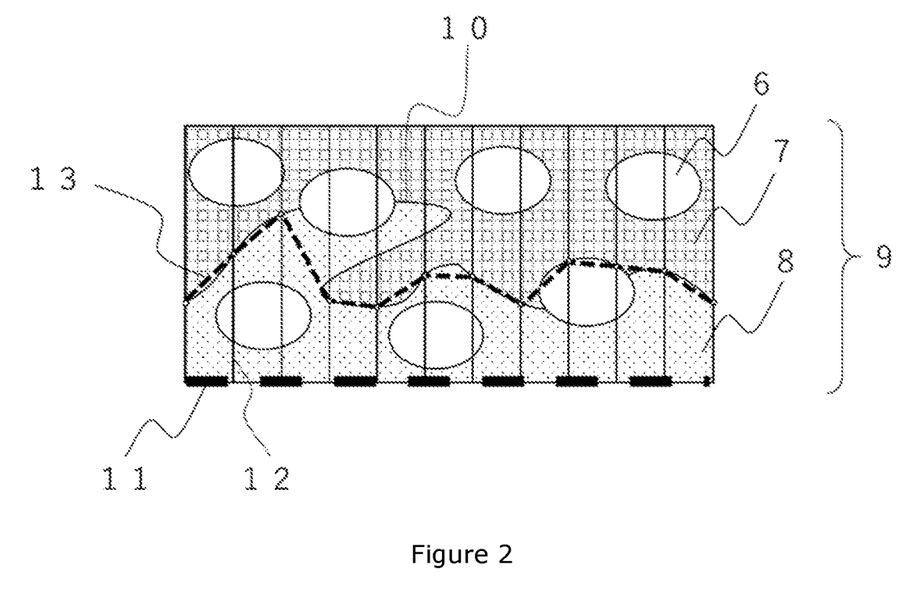
FIG. 2 is a schematic view showing a cross-section vertical to a prepreg plane or a laminate plane in an embodiment of the present invention, and helps to explain a method for measuring an average roughness length RSm and an average roughness height Rc.

In addition, it is preferable that the resin area including [B] and the resin area including [C] are adjacent to each other in a layered state to form the interface. The phrase "adjacent to each other in a layered state" refers to a state in which the two continuous resin areas are present adjacent to each other, as shown in FIG. 2 as an example, and it can be confirmed by observing a cross-section obtained by cutting the prepreg vertically to the prepreg plane direction.

The presence of the reinforcing fibers [A] included in the resin area including the structural component [B] and the resin area including the structural component [C] across the interface between the two resin areas improves the strength of the resin area including the structural component [C], and improves the joining strength. The structural component [A] present on the interface is chemically and/or physically bonded to the structural component [B] and to the structural component [C], whereby the adhesive force between the resin area including the structural component [B] and the resin area including the structural component [C] is improved. It is enough that the number of the fibers in the structural component [A] present on the interface is 1 or more, and though the upper limit of the number is not particularly limited, it is 200 in an observation range described below.

When the prepreg is viewed in planar view, i.e., it is viewed vertically to the prepreg plane direction, the interface between the resin area including the structural component [B] and the resin area including the structural component [C] is observed in a cross-section vertical to a prepreg plane including the fibers [A], present across the two resin areas, from a direction of an angle different by 45 degrees, either clockwise or counterclockwise, to the direction of any fiber [A] included in the two resin areas. In the cross-section, when the states of the resin areas are observed at the interface, it is possible to simultaneously evaluate the adhesive force in the fiber direction and in the direction vertical thereto.

In such a cross-sectional observation, it is preferable that the cross-sectional curve, formed by the interface, has an average roughness length RSm, defined in accordance with JIS B0601 (2001), of 100 μm or less, because it is less likely to be peeled off the resin area including the structural component [B] and the resin area including the structural component [C] from each other due to not only a chemical and/or physical bonding force but also a mechanical bonding force of entanglement. The lower limit thereof is not particularly limited, and is preferably 15 μm or more for avoiding decrease in the mechanical bonding force due to stress concentration. It is preferable that the cross-sectional curve has an average roughness height Rc of 3.5 μm or more, because not only the mechanical bonding force is exhibited by the entanglement but also the structural component [A], present on the interface, is chemically and/or physically bonded to the structural component [B] and the structural component [C], thus resulting in the improvement of the adhesive force between the resin area including the structural component [B] and the resin area including the structural component [C]. The average roughness height Rc of the cross-sectional curve is more preferably 10 μm or more, particularly preferably 20 μm or more, in which the structural component [A] is easily included in the two resin areas and thus the adhesive force is further improved. The upper limit is not particularly limited, and is preferably 100 μm or less for avoiding decrease in the mechanical bonding force due to stress concentration.

Here, for measuring the average roughness height Rc and the average roughness length RSm of the cross-sectional curve, known methods can be used. Examples thereof may include a method in which after the structural component [B] is cured, measurement is performed from a cross-sectional image obtained using an X-ray CT, a method in which measurement is performed from an elemental analysis mapping image by using an energy dispersive X-ray spectrometer (EDS), and a method in which measurement is preformed from a cross-sectional observation image by using an optical microscope, a scanning electron microscope (SEM), or a transmission electron microscope (TEM). In the observation, the structural component [B] and/or the structural component [C] may be dyed in order to adjust the contrasts. In the image obtained by any of the above methods, the average roughness height Rc and the average roughness length RSm of the cross-sectional curve are measured in a range of 500 μm square.

One example of the method for measuring the average roughness height Rc or the average roughness length RSm of the cross-sectional curve (a method 1 for measuring a cross-sectional curve element) is shown with reference to FIG. 2. Vertical baselines 12 are drawn at an interval of 5 μm from the resin area 8 including the structural component [B] toward the resin area 7 including the structural component [C], the end 11 on the resin area including the structural component [B] in the rectangular observation image 9 being defined as a baseline. Points at which the vertical baseline drawn from the baseline intersects the structural component [C] for the first time are plotted, and a line connecting the plotted points is defined as a cross-sectional curve 13. The obtained cross-sectional curve 13 is subjected to a filtering processing in accordance with JIS B0601 (2001), and the average roughness height Rc and the average roughness length RSm of the cross-sectional curve 13 are calculated.

It is preferable that the resin area including [B] and the resin area including [C] are adjacent to each other in a layered state to form the interface, because the excellent dynamic characteristics can be exhibited.

In the prepreg of the present invention, it is preferable that the structural component [C], the thermoplastic resin, has a basis weight of 10 g/m$^2$ or more. The basis weight is preferably 10 g/m$^2$ or more, because a sufficient thickness for exhibiting the excellent joining strength can be obtained. The basis weight is more preferably 20 g/m$^2$. The upper limit is not particularly limited, and is preferably 500 g/m$^2$ or less, because the amount of the thermoplastic resin is not excessively large as compared to the amount of the reinforcing fibers, and a laminate having the excellent specific strength and specific elastic modulus can be obtained. Here, the basis weight refers to a mass (g) of the structural component [C] included per 1 m$^2$ of the prepreg.

The prepreg of the present invention preferably has an amount of the reinforcing fibers per unit area of 30 to 2,000 g/m$^2$. When the amount of the reinforcing fibers is 30 g/m$^2$ or more, the number of layers can be reduced for obtaining a predetermined thickness in the molding of the laminate, and the operation tends to be simple. On the other hand, when the amount of the reinforcing fibers is 2,000 g/m$^2$ or less, the drapability of the prepreg is easily improved.

The mass content of the reinforcing fibers in the prepreg of the present invention is preferably 30 to 90% by mass, more preferably 35 to 85% by mass, still more preferably 40 to 80% by mass. The range may be a combination of any of the above upper limits and any of the lower limits, described above. When the mass content of the reinforcing fibers is 30% by mass or more, the amount of the resin is not excessively large relative to the amount of the fibers, and it is easy to obtain the advantage of the laminate having the excellent specific strength and specific elastic modulus, and a calorific value is hardly excessively increased at the time of curing during the molding of the laminate. When the mass content of the reinforcing fibers is 90% by mass or less, poor impregnation of the resin is unlikely to occur, and voids in the resulting laminate are likely to be reduced.

The laminate according to embodiments of the present invention satisfies the following forms. It includes the structural components [A], [C] and [D], wherein [D] has a rubbery state elastic modulus of 10 MPa or more at a temperature obtained by adding 50° C. to the glass transition temperature, and the reinforcing fibers [A] are present which are contained in the resin area including [C] and the resin area including [D] across the interface between the two resin areas.

The presence of [A] included in the two resin areas across the interface between the two resin areas can be confirmed by observing a cross-section obtained by cutting the laminate vertically to the planar direction of the laminate, similarly to the confirmation method in the prepreg described above.

One example is shown with reference to FIG. 2. In the observation image 9 in FIG. 2, in the laminate, the resin area 7 including the structural component [C] closely adheres to the resin area 8 including the structural component [D], and a surface at which the resin area 7 including the structural component [C] and the resin area 8 including the structural component [D] closely adhere to each other is illustrated as an interface 10. In addition, a plurality of the structural components [A] 6 are present on the interface 10. The structural component [A] 6 on the interface 10 is brought into contact with both of the resin area 7 including the structural component [C] and the resin area 8 including the structural component [D]. The state in which the structural component [C] and the structural component [D] are brought into contact with each other around the reinforcing fiber, as described above, can refer to a state in which the reinforcing fibers are "included in the two resin areas across the interface".

Furthermore, when the laminate according to embodiments of the present invention is viewed in planar view, in a cross-section vertical to a plane of the laminate including [A], present across the two resin areas, at an angle of 45 degrees in a viewpoint vertical to the plane direction of the laminate, either clockwise or counterclockwise, to the direction of any fiber [A] included in the two resin areas, i.e., in a cross-section to be observed, obtained by cutting the laminate vertically to the laminate plane direction, it is preferable that a cross-sectional curve, formed by the interface between the two resin areas closely adhering to each other, has an average roughness length RSm, defined in accordance with JIS B0601 (2001), of 100 μm or less, and an average roughness height Rc of 3.5 μm or more. The average roughness height Rc is more preferably 10 μm or more. The lower limit of RSm and the upper limit of Rc are not particularly limited, and RSm is preferably 15 μm or more and Rc is preferably 100 μm or less in terms of concern of reduction in the mechanically bonding force due to the stress concentration.

As a method for measuring the average roughness height Rc and the average roughness length RSm of the cross-sectional curve, the same method as in the measuring method in the prepreg of the present invention, as described above, can be employed.

It is preferable that the resin area including [C] and the resin area including [D] are adjacent to each other in a layered state to form the interface, because the excellent dynamic characteristics can be exhibited. The phrase adjacent in a layered state refers to a state in which the two continuous resin areas are present adjacent to each other, as illustrated in FIG. 2 as an example, and it can be confirmed by observing a cross-section obtained by cutting the laminate vertically to the laminate planar direction.

The method for molding the laminate of the present invention may include, for example, molding methods such as a press molding method, an autoclave molding method, a bagging molding method, a wrapping tape method, an internal pressure molding method, a hand lay-up method, a filament winding method, a pultrusion method, a resin injection molding method, and a resin transfer molding method.

The laminate of the present invention can be produced by a method in which the prepreg of the present invention described above is laminated alone or together with another prepreg to form a product in which the prepreg of the invention forms at least a part of the layers, and the laminate is cured by pressurization and heating. Here, as the method for applying heat and pressure, for example, a press molding method, an autoclave molding method, a bagging molding method, a wrapping tape method, an internal pressure molding method, or the like, is adopted.

In the laminate of the present invention, there is the structural component [C], the thermoplastic resin, on the surface thereof or between the layers. It is preferable that the structural component [C] is present both on the surface of the laminate and between the layers. When the structural component [C], the thermoplastic resin, is present on the surface of the laminate, the laminate of the present invention can be joined to the same or different kind of member through the structural component [C] by welding; on the other hand, when the structural component [C], the thermoplastic resin, is present between the layers in the laminate, the excellent interlaminar fractural toughness values ($G_{IC}$ and $G_{IIC}$) can be obtained.

The laminate of the present invention can be integrated (welded) with another member, i.e., a member (adherend), which is the same and/or different kind of member forming the laminate, through the structural component [C] present on the surface of the laminate, by joining the member to the structural component [C] by some kind of heating means. The different kind of member (adherend) may include members including a thermoplastic resin and members including a metal material. The member including the thermoplastic resin may include reinforcing fibers or filler, and the like. The integration method is not particularly limited, and may include, for example, thermal welding, vibration welding, ultrasonic welding, laser welding, resistance welding, induction welding, insert injection molding, outsert injection molding, and the like.

The strength of the joint of the integrated member can be evaluated based on ISO 4587: 1995 (JIS K6850 (1994)). The tensile shear joining strength, measured based on ISO 4587: 1995, is preferably 25 MPa or more, more preferably 28 MPa or more at a test environment temperature of 23° C. In general, when the tensile shear joining strength is 20 MPa or more, the laminate can be utilized for joining structural materials, and the strength is higher compared to a tensile shear joining strength (about 10 MPa) of an adhesive generally used at a test environment temperature of 23° C. In applications requiring the dynamic characteristics in a high temperature environment, it is preferable that the joining strength is 13 MPa or more, more preferably 16 MPa or more at a test environment temperature of 80° C., in an evaluation based on ISO 4587: 1995. The better the laminate, the higher the tensile shear joining strength and the upper limit thereof is not particularly limited, and in integrated moldings of laminates generally used, the upper limit of the tensile shear joining strength is 200 MPa at a test environment temperature of 23° C. or 80° C.

The laminate of the present invention is preferably used in aircraft structural members, wind turbine blades, automobile external plates, computer applications such as IC trays and housings of laptop computers, and sports applications such as golf shafts and tennis rackets.

EXAMPLES

Hereinafter, the present invention will be described in more detail with reference to Examples. However, the scope of the present invention is not limited to these Examples. The unit "part" of the composition ratio means part by mass unless otherwise noted. In addition, measurements of various characteristics were performed under an environment in which a temperature was 23° C. and a relative humidity was 50% unless otherwise noted.

<Materials used in Examples and Comparative Examples>

The following structural components [A], [B], [C], and [D] were used. The structural components used in each of Examples and Comparative Examples are as shown in Tables 1 to 3.

Structural Component [A]: Reinforcing fibers
T800: Carbon fiber ("TORAYCA (registered trademark)" T800S-24 K, manufactured by Toray Industries, Inc., strand tensile strength: 5.9 GPa)
T1100: Carbon fiber ("TORAYCA (registered trademark)" T1100G-24 K, manufactured by Toray Industries, Inc., strand tensile strength: 7.0 GPa)
T700: Carbon fiber ("TORAYCA (registered trademark)" T700S-24 K, manufactured by Toray Industries, Inc., strand tensile strength: 4.9 GPa).

Structural Component [C]: Thermoplastic Resin
PA6: Film including polyamide 6 ("Amilan" (registered trademark) CM 1007 (melting point: 225° C., a glass transition temperature: 48° C., manufactured by Toray Industries, Inc.)), and having a basis weight of 120 g/m$^2$
PPS: Film including polyphenylene sulfide ("Torelina" (registered trademark) A670T05 (manufactured by Toray Industries, Inc., a melting point: 278° C., a glass transition temperature: 90° C.)), and having a basis weight of 120 g/m$^2$
PEKK1: Film including polyether ketone ketone ("KEPSTAN" (registered trademark) 6002 (manufactured by Arkema Com., melting point: 300° C., glass transition temperature: 160° C.)), and having a basis weight of 120 g/m$^2$
PEKK2: Film including polyether ketone ketone ("KEPSTAN" (registered trademark) 7002 (manufactured by Arkema Com., melting point: 331° C., glass transition temperature: 162° C.)), and having a basis weight of 120 g/m$^2$
PEEK: Film including polyether ether ketone (PEEK 450G (manufactured by Victrex plc, melting point: 343° C., glass transition temperature: 143° C.)), and having a basis weight of 120 g/m$^2$
PEI: Film including polyetherimide ("ULTEM" (registered trademark) 1010 manufactured by SABIC, glass transition temperature: 217° C.)) and having a basis weight of 120 g/m$^2$
Semi-aromatic PA: Film including polyamide 6T (melting point: 320° C., glass transition temperature: 125° C.) and having a basis weight of 120 g/m$^2$.

<Method for Evaluating Thermoplastic Resin>

(1) Method for Measuring Melting Point and Glass Transition Temperature of Thermoplastic Resin The melting point and the glass transition temperature of the thermoplastic resin were measured using a differential scanning calorimeter (DSC) based on JIS K7121 (2012). When a plurality of melting points or glass transition temperatures were observed in a mixture, or the like, the highest melting point was adopted as the melting point of the thermoplastic resin.

<Production Method and Evaluation Method of Thermosetting Resin Composition>

A thermosetting resin composition of each specific example described in Table 1 was prepared using the following compounds.

(1) Structural Component [B]: Thermosetting Resin (Epoxy Resin)

Tetraglycidyl diaminodiphenylmethane ("Araldite" (registered trademark) MY721, manufactured by Huntsman Advanced Materials LLC.), epoxy equivalent: 113 (g/eq.), tetrafunctional glycidyl amine type epoxy resin)

Bisphenol A type epoxy resin ("jER" (registered trademark) 825, manufactured by Mitsubishi Chemical Corporation), epoxy equivalent: 175 (g/eq.))

Phenol novolak type epoxy resin ("jER" (registered trademark) 154, manufactured by Mitsubishi Chemical Corporation), epoxy equivalent: 178 (g/eq.))

Bisphenol A type epoxy resin ("jER" (registered trademark) 1001, manufactured by Mitsubishi Chemical Corporation), epoxy equivalent: 475 (g/eq.)).

(2) Amine Compound 4,4'-Diaminodiphenyl sulfone (SEIKACURE S, manufactured by Wakayama Seika Kogyo Co., Ltd.)

Dicyandiamide (DICY7, manufactured by Mitsubishi Chemical Corporation).

(3) Curing Catalyst 3-(3,4-dichlorophenyl)-1,1-dimethylurea (DCMU99, manufactured by Hodogaya Chemical Co., Ltd.).

(4) Viscosity Modifier

Polyethersulfone ("SUMIKA EXCEL" (registered trademark) PES5003P, manufactured by Sumitomo Chemical Co., Ltd.).

(5) Phosphorus Compound

Red phosphorus flame retardant ("Nova Red" (registered trademark) 120, manufactured by Phosphor Chemical Industry Co., Ltd., phosphorus atom content: 85% by mass).

(6) Method for Preparing Thermosetting Resin Composition

The epoxy resin and the viscosity modifier described in Table 1 were charged into a kneading apparatus, and the mixture was heated and kneaded to dissolve the viscosity modifier (however, there was a case in which no viscosity modifier was added). Subsequently, the temperature was lowered to 100° C. or lower while continuing the kneading, then the compounds appropriately selected from the amine compounds, the curing catalyst and the phosphorus compound shown in Table 1 (there was a case in which no curing catalyst nor phosphorus compound was added) were added thereto, and the resulting mixture was stirred to obtain thermosetting resin compositions of B-1 to B-10.

<Production Method and Evaluation Method of Cured Product of Thermosetting Resin>

The thermosetting resin composition, prepared as above, was injected into a mold, the temperature was raised from 30° C. to a curing temperature described in Table 1 at a rate of 1.5° C./min in a hot air dryer, the composition was heated and cured for a curing time described in Table 1, and then the temperature was lowered to 30° C. at a rate of 2.5° C./min to produce a plate-shaped cured product of the thermosetting resin having a thickness of 2 mm. It is the cured product of the structural component [B], the curable resin, and is the structural component [D], the cured product of the thermosetting resin. The obtained cured product of the thermosetting resin was subjected to the evaluations by the following methods in each specific example described in Table 1.

<Method for Measuring Glass Transition Temperature and Rubbery State Elastic Modulus of Cured Product of Thermosetting Resin>

A test piece having a width of 12.7 mm and a length of 45 mm was cut out from the resin cured product plate produced by the above method, the test piece was dried in a vacuum oven at 60° C. for 24 hours, a storage elastic modulus curve was obtained by a dynamic viscoelasticity test in accordance with JIS K 7244-7 (2007), and in the storage elastic modulus curve, a value of the temperature at the intersection of a tangent in a glass state and a tangent in a transition state was defined as the glass transition temperature. Here, the measurement was performed at a temperature-raising rate of 5° C./min and a frequency of 1 Hz. A storage elastic modulus at a temperature 50° C. higher than the obtained glass transition temperature was defined as the rubbery state elastic modulus.

<Method for Measuring Bending Strength of Cured Product of Thermosetting Resin>

A test piece having a length of 60 mm and a width of 10 mm was cut out from the resin cured product plate produced by the above method, the test piece was dried in a vacuum oven at 60° C. for 24 hours, a three-point bending test was performed at a test speed of 2.5 ram/min and an inter-fulcrum distance of 32 mm using a universal material testing machine ("Instron" (registered trademark) model 5565 P8564 manufactured by Instron Japan Co., Ltd.), and the bending strength was determined in accordance with JIS K7171 (1994).

<Method for Producing Prepreg>

The prepreg was prepared by the following 2 methods. The structural components used in each Example were as described in Tables 2 and 3.

Prepreg [I]

While the structural component [A], the reinforcing fibers (basis weight: 193 g/m²), was drawn out as a reinforcing fiber sheet in a continuous state in which the fibers were aligned in one direction and the sheet was run in one direction, a resin sheet including the structural component [C] and having a basis weight of 120 g/m² was put on the continuous reinforcing fiber sheet, and the structural component [C] was melted by heating it with an IR heater to attach it to the entire one surface of the continuous reinforcing fiber sheet, and pressure was applied to the resulting sheet with nip rolls having a surface temperature maintained to be equal to or lower than the melting point of the structural component [C] to cool the reinforcing fiber sheet impregnated, whereby a fiber-reinforced resin intermediate. The thermosetting resin composition, the structural component [B], selected as described in Tables 2 and 3, was coated on a release paper in a resin basis weight of 100 g/m² using a knife coater to produce a thermosetting resin film, and then the thermosetting resin film was overlaid on a surface opposite to the surface impregnated with the structural component [C] in the intermediate, and the resulting film was heated and pressurized by using heat rolls to impregnate the intermediate with the thermosetting resin composition, whereby a prepreg [I] was obtained.

Prepreg [II]

The thermosetting resin composition, the structural component [B], selected as described in Tables 2 and 3, was coated on a release paper in a resin basis weight of 50 g/m² using a knife coater to produce a resin film. The resin film was overlaid on both sides of the reinforcing fibers (basis weight: 193 g/m²), the structural component [A], aligned in one direction, and the resulting film was heated and pressurized by using heat rolls to impregnate the carbon fibers with the thermosetting resin composition, whereby a prepreg [II] was obtained.

<Method for Producing Laminate and Evaluation of Dynamic Characteristics>

(1) Method for Measuring Tensile Shear Joining Strength

The prepregs [I] and [II], produced above, were cut into predetermined sizes to obtain 2 prepregs [I] and 6 prepregs [II]. The prepregs were laminated at $[0°/90°]_{2s}$ wherein an axial direction of the reinforcing fiber was defined as 0°, a direction orthogonal to the axial direction was defined as 90°, and the symbol s indicates mirror symmetry, to produce a preform. At that time, the lamination was performed so that the 2 outermost layers of the preform were the prepregs [I]. That is, the lamination was performed so that the 6 prepregs [II] were put between the 2 prepregs [I]. Both surface layers of the preform were the thermoplastic resin layers including the structural component [C]. That is, the prepreg [I] was disposed so that the surface impregnated with the structural component [C] in the prepreg [I] was on the outer side. This preform was set in a press molding die, a pressure of 0.6 MPa was applied with a press machine while maintaining this shape using a jig or a spacer as necessary, and the preform was heated under the conditions described in Tables 2 and 3 to obtain a laminate. The existence position of the structural component [C] was on the surface of the laminate.

The obtained laminate was cut into 2 sheets having sizes of a width of 250 mm and a length of 92.5 mm, in which the 0° direction is the length direction of the test piece, and dried in a vacuum oven for 24 hours. Thereafter, 2 cut panels having sizes of a width of 250 mm and a length of 92.5 mm, were overlaid on each other, with a width of 25 mm×a length of 12.5 mm in which the 0° direction was the length direction, a pressure of 3 MPa was applied thereto at a temperature 20° C. higher than the melting point of the thermoplastic resin, the structural component [C] used, and it was held for 1 minute to weld the overlaid surfaces, whereby an integrated molding was obtained. A tab was bonded to the obtained integrated molding in accordance with ISO 4587: 1995 (JIS K6850 (1994)), and it was cut into a width of 25 mm to obtain a desired test piece.

The obtained test piece was dried in a vacuum oven for 24 hours, the tensile shear joining strength was measured at an environmental temperature of 23° C. or 80° C. based on ISO 4587: 1995 (JIS K6850 (1994)), and evaluation was performed as described below based on the measurement results. The results are shown in Table.

(a) Tensile Shear Joining Strength at 23° C.
28 MPa or more: A
25 MPa or more and less than 28 MPa: B
20 MPa or more and less than 25 MPa: C
Less than 20 MPa: D (failed)
(b) Tensile Shear Joining Strength at 80° C.
16 MPa or more: A
13 MPa or more and less than 16 MPa: B
10 MPa or more and less than 13 MPa: C
Less than 10 MPa: D (failed).

(2) Method for Measuring Compressive Strength

The prepregs [I] and [II], as produced above, were cut into predetermined sizes to obtain 2 prepregs [I] and 4 prepregs [II]. 2 outermost layers of both surfaces were the prepregs [I], the 4 prepregs [II] were put between them, and a total of 6 layers were laminated so that all of the layers had the same reinforcing fiber direction, whereby a preform was produced. At that time, both surface layers of the preform were the thermoplastic resin layers including the structural component [C]. This preform was set in a press molding die, a pressure of 0.6 MPa was applied with a press machine while maintaining this shape using a jig or a spacer as necessary, and the preform was heated under the conditions described in Tables 2 and 3 to obtain a laminate. The existence position of the structural component [C] was on the surface of the laminate.

A tab was bonded to the obtained laminate in accordance with SACMA-SRM 1R-94, and then it was cut into a rectangular test piece having a length of 80 mm and a width of 15 mm, in which the reinforcing fiber axis direction was the length direction of the test piece. The obtained test piece was dried in a vacuum oven at 60° C. for 24 hours, the compressive strength was measured in a 23° C. environment using a universal material testing machine ("Instron" (registered trademark) model 5565 P8564 manufactured by Instron Japan Co., Ltd.) in accordance with SACMA-SRM 1R-94, and evaluation was performed as described below based on the measurement results. The results are shown in Table.

1.6 GPa or more: A
1.4 GPa or more and less than 1.6 GPa: B
1.2 GPa or more and less than 1.4 GPa: C
Less than 1.2 GPa: D (failed).

(3) Method for Measuring Interlaminar Fractural Toughness Value ($G_{IC}$ and $G_{IIC}$)

The prepreg [I] produced above was cut into a predetermined size, and a total of 20 prepregs were laminated with the surface on which the structural component [C] present facing upward so as to have the same reinforcing fiber direction. At that time, a release film for introducing a preliminary crack was put between the 10th sheet and the 11th sheet, which were placed at the center, to prepare a preform. This preform was set in a press molding die, a pressure of 0.6 MPa was applied with a press machine while maintaining this shape using a jig or a spacer as necessary, and the preform was heated at 180° C. for 120 minutes to obtain a laminate. The existence position of the structural component [C] was between the layers of the laminate and on the one side of the surfaces.

The obtained laminate was cut into a rectangular test piece having a length of 150 mm and a width of 20 mm, in which the reinforcing fiber axis was the length direction of the test piece, and dried in a vacuum oven at 60° C. for 24 hours. The obtained test piece was evaluated for interlaminar fractural toughness values ($G_{IC}$ and $G_{IIC}$) in a 23° C. environment in accordance with JIS K7086 (1993).

<Measurement of Average Roughness Length RSm and Average Roughness Height Rc in Prepreg or Laminate>

Figure 1:
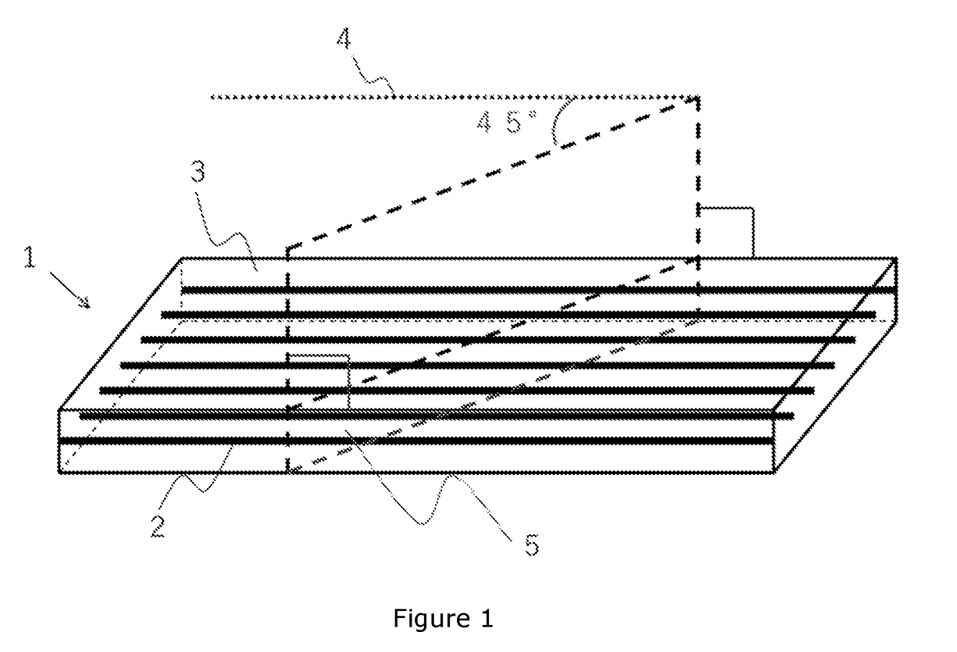
FIG. 1 is a schematic view showing a prepreg or a laminate according to an embodiment of the present invention, and showing a cross-section vertical to a prepreg plane or a laminate plane in FIG. 2.

The prepreg [I] or the laminate, as produced above, was used. As shown in FIG. 1, in the prepreg, an image of a cross-section 5 to be observed, cut vertically to the prepreg plane direction, was photographed at a magnification of 1000 using an optical microscope, in a planar view of the prepreg to the fiber direction 4 of any [A] included in the two resin areas, i.e., at an angle of 45 degrees in a viewpoint vertical to the prepreg plane direction. In an arbitrary observation range of 500 μm square in the obtained image, the average roughness length RSm and the average roughness height Rc, defined in JIS B0601 (2001) of the cross-sectional curve element obtained by the measurement method 1 of the cross-sectional curve element, were measured. The same applies to the laminate.

Examples 1 to 16

In Examples 1 to 16, a laminate was produced by the method described in (1) Method for Measuring Tensile Shear Joining Strength and the method described in (2) Method for Measuring Compressive Strength.

Examples 1 to 3

As shown in Table 1, in Examples 1 to 3, the rubbery state elastic modulus of the cured product of the thermosetting resin tended to be improved as the blending amount of the tri- or higher functional glycidyl amine type epoxy resin (tetraglycidyldiaminodiphenyl methane) was increased. As described in Table 2, the tensile shear joining strength and the compressive strength were improved as the blending amount of tetraglycidyl diaminodiphenylmethane was increased, and a preferable tendency was shown.

Example 1 and Comparative Examples 1 and 2

In Example 1, as shown in Table 2, by using the thermosetting resin having a high rubbery state elastic modulus as the structural component [B], it was shown that the tensile shear joining strength and the compressive strength of the laminate were excellent as compared with those in Comparative Examples 1 and 2 shown in Table 3 (the rubbery state elastic modulus of the thermosetting resin was less than 10 MPa).

Example 1 and Examples 4 and 5

As shown in Table 1, in Example 4 and Example 5 in which the thermosetting resin composition different from that in Example 1 was used, the tensile shear joining strength and the compressive strength at 80° C. tended to slightly decrease as compared with Example 1, as shown in Table 2, but all of them exhibited excellent characteristics.

Example 1 and Examples 6 and 7

As shown in Table 1, in Example 6 and Example 7, as compared with Example 1, the bending strength of the cured product of the thermosetting resin tended to decrease with an increase in the blending amount of the phosphorus compound, and as shown in Table 2, the tensile shear joining strength at 23° C. and the tensile shear joining strength at 80° C. tended to slightly decrease, but all of them showed the excellent characteristics.

Example 1 and Example 8

As shown in Table 2, in Example 8, the production was performed in the same manner as in Example 1 except that no viscosity modifier was used. As shown in Table 2, excellent characteristics were exhibited in Example 8 as in Example 1.

Example 1 and Examples 9 and 10

As described in Table 2, in Examples 9 and 10, when the reinforcing fibers having different strand tensile strengths were used, the tensile shear joining strength at 23° C. and the tensile shear joining strength at 80° C. were more improved as the strand tensile strength was higher, as compared with Example 1, and preferable characteristics were exhibited.

Example 1 and Examples 11 to 16

As described in Table 2, in Examples 11 to 16, when the structural component [C] having a higher glass transition temperature than that in Example 1 was used, the tensile shear joining strength at 80° C. was more improved as compared with that in Example 1, and preferable characteristics were exhibited.

Example 1 and Comparative Example 3

A film of polyamide 6 ("AMILAN" (registered trademark) CM 1007 (manufactured by Toray Industries, Inc.) having a film basis weight of 50 g/m$^2$ was attached to both surfaces of a reinforcing fiber sheet in which the fibers were arranged in one direction in a flat shape, and it was heated and pressed at 250° C. to obtain a prepreg having a reinforcing carbon fiber basis weight of 193 g/m$^2$. The obtained prepreg was cut into a predetermined size, 6 prepregs were laminated at [0°/90°]$_{2s}$ or the same direction for the evaluations of the joining strength and the compressive strength, and then a pressure of 3 MPa was applied thereto with a press machine and was heated at 250° C. for 10 minutes to obtain a laminate. The joining strength and the compressive strength of the obtained laminate were measured by the method described in Examples. As shown in Table 3, because the thermosetting resin was not included, the tensile shear joining strength and the compressive strength at 80° C. were lower than those in Example 1, and it did not exhibit the sufficient characteristics as the structural material.

Example 17 and Comparative Examples 4 and 5

In Example 17, a laminate was produced by the method described in (3) Method for Measuring Interlayer Fractural Toughness Values ($G_{IC}$ and $G_{IIC}$). The prepreg [I] was cut into a predetermined size, and 20, in total, prepregs were laminated on the surface on which the structural component [C] present facing upward so as to have the same reinforcing fiber direction, and a release film for introducing a preliminary crack was put between the 10th sheet and the 11th sheet, which were placed at the center, to produce a preform. In Comparative Example 4, a prepreg [II] (including no structural component [C]) was cut into a predetermined size, the lamination and the insertion of the release film were performed in the same manner as in Example 17 to obtain a preform. In Comparative Example 5, polyamide particles (SP-500, manufactured by Toray Industries, Inc.) were uniformly dispersed on one surface of a prepreg [II] (including no structural component [C]), cut to a predetermined size, in an amount of the particles per unit area of the prepreg of 7 g/m$^2$, and then the lamination and the insertion of the release film were performed in the same manner as in Example 17 to obtain a preform. The preforms obtained in Example 17 and Comparative Examples 4 and 5 were heated at 180° C. for 120 minutes under a pressure of 0.6 MPa using a pressing machine to obtain laminates, and then the interlaminar fractural toughness values ($G_{IC}$ and $G_{IIC}$) were evaluated by the method described in Examples above. As shown in Tables 2 and 3, in Example 17 in which the structural component [C] was included between the layers of the laminate, the excellent interlaminar fractural toughness values were shown as compared with those in Comparative Example 4 in which no structural component [C] was included and Comparative Example 5 in which the thermoplastic resin was included as the different form.

TABLE 1

|  |  |  | B-1 | B-2 | B-3 | B-4 | B-5 | B-6 | B-7 | B-8 | B-9 | B-10 |
|---|---|---|---|---|---|---|---|---|---|---|---|---|
| Thermo-setting resin compo-sition | Structural component [B] Thermosetting resin (Epoxy resin) | Tetraglycidyl diaminodiphenylmethane ("Araldite (registered trademark)" MY721) | 50 | 70 | 30 |  |  | 50 | 50 | 50 |  |  |
|  |  | Bisphenol A type epoxy ("jER (registered trademark)" 825) | 50 | 30 | 70 | 50 | 50 | 50 | 50 | 50 | 100 | 50 |
|  |  | Phenol novolac type epoxy ("jER (registered trademark)" 154") |  |  |  | 50 | 50 |  |  |  |  |  |
|  |  | Bisphenol A type epoxy ("jER (registered trademark)" 1001) |  |  |  |  |  |  |  |  |  | 50 |
|  | Amine compound | 4,4'-diaminodiphenyl sulfone (SEIKACURE S) | 45.1 | 49 | 41.3 | 35.1 |  | 45.1 | 45.1 | 45.1 | 35.4 | 24.2 |
|  |  | Dicyandiamide (DICY7) |  |  |  |  | 6.8 |  |  |  |  |  |
|  | Curing catalyst | 3-(3,4-dichlorophenyl)-1,1-dimethylurea (DCMU99) |  |  |  |  | 3 |  |  |  |  |  |
|  | Viscosity modifier | Polyethersulfone ("SUMIKA EXCEL (registered trademark)" PES5003P) | 7 | 7 | 7 | 7 | 7 | 7 | 7 |  | 7 | 7 |
|  | Phosphorus compound | Red phosphorus flame retardant ("NOVALET (registered trademark)" 120) |  |  |  |  |  | 1.8 | 2.7 |  |  |  |
|  |  | Phosphorus atomic concentration (wt %) | 0 | 0 | 0 | 0 | 0 | 1.0 | 1.5 | 0 | 0 | 0 |
|  | Curing conditions | Curing temperature (° C.) | 180 | 180 | 180 | 180 | 135 | 180 | 180 | 180 | 180 | 180 |
|  |  | Curing time (hours) | 2 | 2 | 2 | 2 | 2 | 2 | 2 | 2 | 2 | 2 |
|  | Characteristics of cured product of thermosetting resin | Rubbery state elastic modulus (MPa) | 15.2 | 19.3 | 12.4 | 13.9 | 12.1 | 14.8 | 14.3 | 15.2 | 9.1 | 6.8 |
|  |  | Glass transition temperature (° C.) | 195 | 210 | 187 | 178 | 137 | 195 | 195 | 195 | 168 | 157 |
|  |  | Bending strength (MPa) | 168 | 182 | 163 | 159 | 156 | 156 | 135 | 162 | 130 | 125 |

TABLE 2

|  |  | Example 1 | Example 2 | Example 3 | Example 4 |
|---|---|---|---|---|---|
|  | Structural Component [A]: Reinforcing fibers | T800 | T800 | T800 | T800 |
|  | Thermosetting resin composition (including structural component [B]) | B-1 | B-2 | B-3 | B-4 |
|  | Structural Component [C]: Thermoplastic Resin | PA6 | PA6 | PA6 | PA6 |
| Characteristics of reinforcing fiber | Tensile strength (GPa) | 5.9 | 5.9 | 5.9 | 5.9 |
| Characteristics of cured product of thermosetting resin (Structural component [D]) | Rubbery state elastic modulus (MPa) | 15.2 | 19.3 | 12.4 | 13.9 |
|  | Bending strength (MPa) | 168 | 182 | 163 | 159 |
|  | Reinforcing fibers [A] included in two resin areas across interface | Presence | Presence | Presence | Presence |
|  | State and arrangement of resin area including [B] or [D] and the resin area including [C] | Layered/Adjacent | Layered/Adjacent | Layered/Adjacent | Layered/Adjacent |
|  | Average roughness length RSm (μm) of prepreg or laminate | 47 | 43 | 45 | 45 |
|  | Average roughness height Rc (μm) of prepreg or laminate | 23 | 24 | 22 | 21 |
| Molding conditions of preform | Curing temperature (° C.) | 180 | 180 | 180 | 180 |
|  | Curing time (hours) | 2 | 2 | 2 | 2 |
| Characteristics of laminate | Tensile shear joining strength at 23° C. (MPa) | A / 29.9 | A / 30.1 | A / 29.0 | A / 28.3 |
|  | Tensile shear joining strength at 80° C. (MPa) | A / 16.4 | A / 18.6 | B / 15.8 | B / 15.7 |
|  | Compressive strength (GPa) | B / 1.54 | A / 1.66 | B / 1.45 | B / 1.41 |
|  | Position of structural component [C] | Surface | Surface | Surface | Surface |
|  | Interlaminar fractural toughness $G_{IC}$ (KJ/m$^2$) | — | — | — | — |
|  | Interlaminar fractural toughness $G_{IIC}$ (KJ/m$^2$) | — | — | — | — |

|  |  | Example 5 | Example 6 | Example 7 | Example 8 |
|---|---|---|---|---|---|
|  | Structural Component [A]: Reinforcing fibers | T800 | T800 | T800 | T800 |
|  | Thermosetting resin composition (including structural component [B]) | B-5 | B-6 | B-7 | B-8 |
|  | Structural Component [C]: Thermoplastic Resin | PA6 | PA6 | PA6 | PA6 |
| Characteristics of reinforcing fiber | Tensile strength (GPa) | 5.9 | 5.9 | 5.9 | 5.9 |
| Characteristics of cured product of thermosetting resin (Structural component [D]) | Rubbery state elastic modulus (MPa) | 12.1 | 14.8 | 14.3 | 15.2 |
|  | Bending strength (MPa) | 156 | 156 | 135 | 162 |

TABLE 2-continued

|  |  |  |  |  |  |
|---|---|---|---|---|---|
| Reinforcing fibers [A] included in two resin areas across interface |  | Presence | Presence | Presence | Presence |
| State and arrangement of resin area including [B] or [D] and the resin area including [C] |  | Layered/ Adjacent | Layered/ Adjacent | Layered/ Adjacent | Layered/ Adjacent |
| Average roughness length RSm (μm) of prepreg or laminate |  | 46 | 47 | 43 | 45 |
| Average roughness height Rc (μm) of prepreg or laminate |  | 22 | 22 | 21 | 22 |
| Molding conditions of preform | Curing temperature (° C.) | 135 | 180 | 180 | 180 |
|  | Curing time (hours) | 2 | 2 | 2 | 2 |
| Characteristics of laminate | Tensile shear joining strength at 23° C. (MPa) | A<br>28.1 | B<br>26.5 | C<br>24.4 | A<br>29.1 |
|  | Tensile shear joining strength at 80° C. (MPa) | B<br>14.5 | B<br>13.8 | B<br>13.1 | A<br>16.1 |
|  | Compressive strength (GPa) | C<br>1.34 | B<br>1.52 | B<br>1.50 | B<br>1.52 |
|  | Position of structural component [C] | Surface | Surface | Surface | Surface |
|  | Interlaminar fractural toughness $G_{IC}$ (KJ/m$^2$) | — | — | — | — |
|  | Interlaminar fractural toughness $G_{IIC}$ (KJ/m$^2$) | — | — | — | — |

|  |  | Example 9 | Example 10 | Example 11 | Example 12 | Example 13 |
|---|---|---|---|---|---|---|
| Structural Component [A]: Reinforcing fibers |  | T1100G | T700 | T800 | T800 | T800 |
| Thermosetting resin composition (including structural component [B]) |  | B-1 | B-1 | B-1 | B-1 | B-1 |
| Structural Component [C]: Thermoplastic Resin |  | PA6 | PA6 | PPS | PEKK1 | PEKK2 |
| Characteristics of reinforcing fiber | Tensile strength (GPa) | 7.0 | 4.9 | 5.9 | 5.9 | 5.9 |
| Characteristics of cured product of thermosetting resin (Structural component [D]) | Rubbery slate elastic modulus (MPa) | 15.2 | 15.2 | 15.2 | 15.2 | 15.2 |
|  | Bending strength (MPa) | 168 | 168 | 168 | 168 | 168 |
| Reinforcing fibers [A] included in two resin areas across interface |  | Presence | Presence | Presence | Presence | Presence |
| State and arrangement of resin area including [B] or [D] and the resin area including [C] |  | Layered/ Adjacent | Layered/ Adjacent | Layered/ Adjacent | Layered/ Adjacent | Layered/ Adjacent |
| Average roughness length RSm (μm) of prepreg or laminate |  | 56 | 41 | 57 | 48 | 53 |
| Average roughness height Rc (μm) of prepreg or laminate |  | 20 | 26 | 19 | 22 | 20 |
| Molding conditions of preform | Curing temperature (° C.) | 180 | 180 | 180 | 180 | 180 |
|  | Curing time (hours) | 2 | 2 | 2 | 2 | 2 |
| Characteristics of laminate | Tensile shear joining strength at 23° C. (MPa) | A<br>32.8 | C<br>24.8 | B<br>26.4 | A<br>29.9 | A<br>30.6 |
|  | Tensile shear joining strength at 80° C. (MPa) | A<br>18.0 | B<br>13.8 | A<br>19.8 | A<br>23.0 | A<br>23.5 |
|  | Compressive strength (GPa) | B<br>1.54 | B<br>1.53 | B<br>1.57 | B<br>1.56 | B<br>1.58 |
|  | Position of structural component [C] | Surface | Surface | Surface | Surface | Surface |
|  | Interlaminar fractural toughness $G_{IC}$ (KJ/m$^2$) | — | — | — | — | — |
|  | Interlaminar fractural toughness $G_{IIC}$ (KJ/m$^2$) | — | — | — | — | — |

|  |  | Example 14 | Example 15 | Example 16 | Example 17 |
|---|---|---|---|---|---|
| Structural Component [A]: Reinforcing fibers |  | T800 | T800 | T800 | T800 |
| Thermosetting resin composition (including structural component [B]) |  | B-1 | B-1 | B-1 | B-1 |
| Structural Component [C]: Thermoplastic Resin |  | PEEK | PEI | Semi-aromatic PA | PA6 |
| Characteristics of reinforcing fiber | Tensile strength (GPa) | 5.9 | 5.9 | 5.9 | 5.9 |
| Characteristics of cured product of thermosetting resin (Structural component [D]) | Rubbery slate elastic modulus (MPa) | 15.2 | 15.2 | 15.2 | 15.2 |
|  | Bending strength (MPa) | 168 | 168 | 168 | 168 |
| Reinforcing fibers [A] included in two resin areas across interface |  | Presence | Presence | Presence | Presence |
| State and arrangement of resin area including [B] or [D] and the resin area including [C] |  | Layered/ Adjacent | Layered/ Adjacent | Layered/ Adjacent | Layered/ Adjacent |
| Average roughness length RSm (μm) of prepreg or laminate |  | 49 | 55 | 51 | 45 |
| Average roughness height Rc (μm) of prepreg or laminate |  | 21 | 19 | 22 | 22 |
| Molding conditions of preform | Curing temperature (° C.) | 180 | 180 | 180 | 180 |
|  | Curing time (hours) | 2 | 2 | 2 | 2 |
| Characteristics of laminate | Tensile shear joining strength at 23° C. (MPa) | A<br>30.3 | A<br>29.3 | A<br>30.2 |  |

TABLE 2-continued

|  |  |  |  |  |
|---|---|---|---|---|
| Tensile shear joining strength at 80° C. (MPa) | A<br>22.9 | A<br>20.5 | A<br>18.8 |  |
| Compressive strength (GPa) | B<br>1.58 | B<br>1.57 | B<br>1.56 |  |
| Position of structural component [C] | Surface | Surface | Surface | Surface + Interlaminar |
| Interlaminar fractural toughness $G_{IC}$ (KJ/m$^2$) | — | — | — | 2.0 |
| Interlaminar fractural toughness $G_{IIC}$ (KJ/m$^2$) | — | — | — | 3.8 |

TABLE 3

|  |  | Comparative Example 1 | Comparative Example 2 | Comparative Example 3 | Comparative Example 4 | Comparative Example 5 |
|---|---|---|---|---|---|---|
| Structural Component [A]: Reinforcing fibers | | T800 | T800 | T800 | T800 | T800 |
| Thermosetting resin composition (including structural component [B]) | | B-9 | B-10 | — | B-1 | B-1 |
| Structural Component [C]: Thermoplastic Resin | | PA6 | PA6 | PA6 | — | PA6 particles |
| Characteristics of reinforcing fiber | Tensile strength (GPa) | 5.9 | 5.9 | 5.9 | 5.9 | 5.9 |
| Characteristics of cured product of thermosetting resin (Structural component [D]) | Rubbery state elastic modulus (MPa) | 9.1 | 6.8 | — | 15.2 | 15.2 |
| | Bending strength (MPa) | 130 | 125 | — | 168 | 168 |
| Reinforcing fibers [A] included in two resin areas across interface | | Presence | Presence | No | No | No |
| State and arrangement of resin area including [B] or [D] and the resin area including [C] | | Layered/Adjacent | Layered/Adjacent | [B] No | [C] No | Not layered |
| Average roughness length RSm (µm) of prepreg or laminate | | 44 | 46 | — | — | — |
| Average roughness height Rc (µm) of prepreg or laminate | | 22 | 21 | — | — | — |
| Molding conditions of preform | Curing temperature (° C.) | 180 | 180 | — | 180 | 180 |
| | Curing time (hours) | 2 | 2 | — | 2 | 2 |
| Characteristics of laminate | Tensile shear joining strength at 23° C. (MPa) | A<br>28.2 | A<br>28.1 | A<br>28.7 | | |
| | Tensile shear joining strength at 80° C. (MPa) | D<br>9.7 | D<br>9.1 | D<br>9.5 | | |
| | Compressive strength (GPa) | C<br>1.22 | D<br>1.09 | D<br>0.98 | — | |
| | Position of structural component [C] | Surface | Surface | Surface | — | Surface + Interlaminar |
| | Interlaminar fractural toughness $G_{IC}$ (KJ/m$^2$) | — | — | — | 0.4 | 0.5 |
| | Interlaminar fractural toughness $G_{IIC}$ (KJ/m$^2$) | — | — | — | 0.8 | 2.4 |

DESCRIPTION OF REFERENCE SIGNS

1: One layer forming prepreg or laminate
2: Structural component [A]
3: Structural component [C] and structural component [B], or structural component [C] and structural component [D]
4: Fiber direction
5: Cross-section to be observed
6: Structural component [A]
7: Resin area including structural component [C]
8: Resin area including structural component [B] or resin area including structural component [D]
9: Observation image
10: Interface
11: Baseline
12: Vertical baseline
13: Cross-sectional curve

The invention claimed is:

1. A prepreg comprising the following structural components [A], [B], and [C], wherein
[B] has a rubbery state elastic modulus of 10 MPa or more at a temperature obtained by adding 50° C. to a glass transition temperature in a state in which a degree of cure is 90% or more,
[C] is present in a surface of the prepreg,
the reinforcing fibers [A] are present, which are included in a resin area including [B] and a resin area including [C] across an interface between the two resin areas:
[A] reinforcing fibers;
[B] a thermosetting resin; and
[C] a thermoplastic resin, and
wherein, in a planar view, when a cross-section vertical to a plane of the prepreg including the [A] is obtained from a direction of an angle different by 45 degrees to a direction of any fiber [A] included in the two resin areas, a cross-sectional curve, formed by the interface between the two resin areas closely adhering to each other, in the cross-section, has an average roughness length RSm, defined in accordance with JIS B0601 (2001), of 100 μm or less, and an average roughness height Rc of 3.5 μm or more.

2. The prepreg according to claim 1, wherein the resin area including the [B] and the resin area including the [C] are adjacent to each other in a layered state to form the interface.

3. The prepreg according to claim 1, wherein the structural component [B] has a rubbery state elastic modulus of 12 MPa or more at a temperature obtained by adding 50° C. to the glass transition temperature in a state in which the degree of cure is 90% or more.

4. The prepreg according to claim 1, wherein the structural component [B] has a rubbery state elastic modulus of 15 MPa or more at a temperature obtained by adding 50° C. to the glass transition temperature in a state in which the degree of cure is 90% or more.

5. The prepreg according to claim 1, wherein
the structural component [B] includes an epoxy resin, and
a 3- or higher functional glycidyl amine type epoxy is included in an amount of 40 to 100 parts by mass based on 100 parts by mass of all of the epoxy resins included in the structural component [B].

6. The prepreg according to claim 1, wherein a composition including the structural component [B] includes an aromatic amine.

7. The prepreg according to claim 1, wherein a composition including the structural component [B] includes phosphorus in an atomic concentration of 1.0% by mass or less.

8. The prepreg according to claim 1, wherein the structural component [B] has a bending strength of 150 MPa or more in the state in which the degree of cure is 90% or more.

9. The prepreg according to claim 1, wherein the average roughness height Rc is 10 μm or more.

10. The prepreg according to claim 1, wherein the structural component [C] is at least one resin selected from crystalline thermoplastic resins having a glass transition temperature of 80° C. or higher and amorphous thermoplastic resins having a glass transition temperature of 160° C. or higher.

11. The prepreg according to claim 1, wherein the structural component [C] is at least one polymer selected from polyarylene ether ketone, polyphenylene sulfide, and polyetherimide.

12. The prepreg according to claim 1, wherein the structural component [A] includes a carbon fiber having a strand tensile strength of 5.5 GPa or more.

13. A laminate comprising a layer including the following components [A], [C], and [D], wherein
[D] has a rubbery state elastic modulus of 10 MPa or more at a temperature obtained by adding 50° C. to the glass transition temperature,
the reinforcing fibers [A] are present, which are included in a resin area including [C] and a resin area including [D] across an interface between the two resin areas:
[A] reinforcing fibers;
[C] a thermoplastic resin; and
[D] a cured product of a thermosetting resin, and
wherein, in a planar view of the prepreg, when a cross-section vertical to a plane of the laminate including the [A] is obtained from a direction of an angle different by 45 degrees to a direction of any fiber [A] included in the two resin areas, a cross-sectional curve, formed by the interface between the two resin areas closely adhering to each other, in the cross-section, has an average roughness length RSm, defined in accordance with JIS B0601 (2001), of 100 μm or less, and an average roughness height Rc of 3.5 μm or more.

14. The laminate according to claim 13, wherein the resin area including the [C] and the resin area including the [D] are adjacent to each other in a layered state to form the interface.

15. The laminate according to claim 13, wherein the structural component [C] is present in the surface.

16. The laminate according to claim 15, wherein a cured product of a prepreg forms at least a part of the layers, wherein the prepreg comprises the following structural components [A], [B], and [C], and wherein
[B] is a thermosetting resin, having a rubbery state elastic modulus of 10 MPa or more at a temperature obtained by adding 50° C. to a glass transition temperature in a state in which a degree of cure is 90% or more,
[C] is present in a surface of the prepreg, and
the reinforcing fibers [A] are present, which are included in a resin area including [B] and a resin area including [C] across an interface between the two resin areas.

17. A molding comprising a laminate according to claim 1 which is integrated with another member by joining it to a surface of a structural component [C].

18. The laminate according to claim 16, wherein the resin area including the [B] and the resin area including the [C] are adjacent to each other in a layered state to form the interface.

19. The laminate according to claim 16, wherein the structural component [B] has a rubbery state elastic modulus of 12 MPa or more at a temperature obtained by adding 50° C. to the glass transition temperature in a state in which the degree of cure is 90% or more.

20. The laminate according to claim 16, wherein the structural component [B] has a rubbery state elastic modulus of 15 MPa or more at a temperature obtained by adding 50° C. to the glass transition temperature in a state in which the degree of cure is 90% or more.

21. The laminate according to claim 16, wherein
the structural component [B] includes an epoxy resin, and
a 3- or higher functional glycidyl amine type epoxy is included in an amount of 40 to 100 parts by mass based on 100 parts by mass of all of the epoxy resins included in the structural component [B].

22. The laminate according to claim 16, wherein a composition including the structural component [B] includes an aromatic amine.

23. The laminate according to claim 16, wherein a composition including the structural component [B] includes phosphorus in an atomic concentration of 1.0% by mass or less.

24. The laminate according to claim 16, wherein the structural component [B] has a bending strength of 150 MPa or more in the state in which the degree of cure is 90% or more.

25. The laminate according to claim 13, wherein the structural component [C] is present between layers.

26. The laminate according to claim 13, wherein the structural component [D] has a rubbery state elastic modulus of 12 MPa or more at a temperature obtained by adding 50° C. to a glass transition temperature.

27. The laminate according to claim 13, wherein the structural component [D] has a bending strength of 150 MPa or more.

28. The laminate according to claim 13, wherein the average roughness height Rc is 10 μm or more.

29. The laminate according to claim 13, wherein the structural component [C] is at least one resin selected from crystalline thermoplastic resins having a glass transition temperature of 80° C. or higher and amorphous thermoplastic resins having a glass transition temperature of 160° C. or higher.

30. The laminate according to claim 13, wherein the constituent element [C] is at least one polymer selected from polyarylene ether ketone, polyphenylene sulfide, and polyetherimide.

31. The laminate according to claim 13, wherein the structural component [A] includes a carbon fiber having a strand tensile strength of 5.5 GPa or more.

* * * * *